United States Patent
Jiang et al.

(10) Patent No.: US 9,963,069 B2
(45) Date of Patent: May 8, 2018

(54) ALARM METHOD FOR REVERSING A VEHICLE BY SENSING OBSTACLES USING STRUCTURED LIGHT

(71) Applicant: METAL INDUSTRIES RESEARCH & DEVELOPMENT CENTRE, Kaohsiung (TW)

(72) Inventors: Jinn-Feng Jiang, Kaohsiung (TW); Shih-Chun Hsu, Kaohsiung (TW); Hung-Yuan Wei, Kaohsiung (TW); Tsung-Han Lee, Kaohsiung (TW); Tsu-Kun Chang, Kaohsiung (TW); Kuei-Shu Hsu, Kaohsiung (TW); Chia-Sui Wang, Tainan (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 58 days.

(21) Appl. No.: 15/352,887

(22) Filed: Nov. 16, 2016

(65) Prior Publication Data

US 2017/0158128 A1    Jun. 8, 2017

(30) Foreign Application Priority Data

Dec. 7, 2015    (TW) .............................. 104140935 A

(51) Int. Cl.
| | |
|---|---|
| *B60Q 1/00* | (2006.01) |
| *B60Q 9/00* | (2006.01) |
| *G06K 9/00* | (2006.01) |
| *G01B 11/25* | (2006.01) |
| *G06K 9/20* | (2006.01) |

(52) U.S. Cl.
CPC .......... *B60Q 9/008* (2013.01); *G01B 11/2513* (2013.01); *G06K 9/00805* (2013.01); *G06K 9/2036* (2013.01); *B60Q 9/005* (2013.01)

(58) Field of Classification Search
CPC .... B60Q 9/005; B60Q 9/008; G01B 11/2513; G06K 9/00805; G06K 9/2036
See application file for complete search history.

(56) References Cited

U.S. PATENT DOCUMENTS

| | | | | | |
|---|---|---|---|---|---|
| 2005/0231341 | A1* | 10/2005 | Shimizu | ................. | B60Q 9/005 340/436 |
| 2009/0309710 | A1* | 12/2009 | Kakinami | ............. | B60Q 9/004 340/435 |
| 2013/0258108 | A1* | 10/2013 | Ono | ...................... | B60W 40/06 348/148 |

FOREIGN PATENT DOCUMENTS

| | | | |
|---|---|---|---|
| JP | 06-059038 | A | 3/1994 |
| JP | 06-087377 | A | 3/1994 |
| JP | 2001343460 | A | 12/2001 |
| JP | 2006168459 | A | 6/2006 |

(Continued)

*Primary Examiner* — Omeed Alizada
(74) *Attorney, Agent, or Firm* — Rosenberg, Klein & Lee

(57) ABSTRACT

The present disclosure provides an alarm method for reversing a vehicle, in particular for a land vehicle, by sensing obstacles using structured light. When a vehicle reverses, the structured-light projecting module installed on the rear side of the vehicle projects structured light continuously, A plurality of light pattern messages are reflected to the structured-light camera unit. Then the height of and the distance to the obstacle are calculated. According to the height of the obstacle, whether the obstacle may influence the vehicle will be judged. If so, sounds will be emitted for reminding the driver according to the distance to the obstacle and the alarm distance information. Thereby, the reversing safety can be improved.

14 Claims, 5 Drawing Sheets

(56) References Cited

FOREIGN PATENT DOCUMENTS

| JP | 2007112317 A | 5/2007 |
|----|--------------|--------|
| JP | 2010188988 A | 9/2010 |
| TW | 201226234 A  | 7/2012 |
| TW | 201432222 A  | 8/2014 |

* cited by examiner

ALARM METHOD FOR REVERSING A VEHICLE BY SENSING OBSTACLES USING STRUCTURED LIGHT

FIELD OF THE INVENTION

The present disclosure relates generally to an alarm method, and particularly to an alarm method for reversing a vehicle by sensing obstacles using structured light applicable to acquiring the braking distance according to current reversing speed while reversing the vehicle, and launching different alarms according to the distance to obstacles and the required braking distance.

BACKGROUND OF THE INVENTION

Automobiles are the most common vehicles in daily lives and at least include left side mirrors, right side mirrors, and rearview mirrors for providing left rear, right rear, and central rear images to drivers by reflection. Nonetheless, the field of view provided by these mirrors for drivers is limited. In addition, for providing drivers with wider field of view, the adoption of convex lenses is indispensable. A convex lens forms shrunk and erect virtual images. Thereby, as a close obstacle is imaged by a convex lens, an illusion that the obstacle looks farer will result. As a consequence, it is difficult for drivers to estimate the real distance to the obstacle.

When automobiles are running on roads, due to limited field of view, errors in estimating distances, spiritual fatigue, or others' non-law-abidance, the safety of the lives of drivers and passersby are both threatened. In order to improve safety, many passive safety equipment pieces have become standard; active safety equipment pieces are continuously developing under the endeavor of various major automobile manufacturers.

Among the current technologies of active safety equipment, some safety alarm devices allowing real-time warning on users are provided, including, for example, reversing radars using signal transmitters and receives, or audio reminding equipment when other objects approach the car. Unfortunately, for drivers, some visual dead spaces of automobiles still exist. In particular, while reversing a car, a large portion of the driver's field of vision is blocked by the car body and forming the visual dead spaces. Consequently, drivers are unable to aware the existence of the obstacles or hollows in roads close to the car body.

According to some current technologies, a camera is installed outside a car. Images are captured by the image extraction device and displayed on the display device in the car for driver's reference. Unfortunately, the range of the images captured by the image extraction device is limited. Besides, the image extraction device should be fixed at the same location. Thereby, the capturing range for images cannot be varied according to turning angle of the car, leading to the generation of some visual dead spaces. Furthermore, the images taken by the image extraction device are planar images, making the drivers difficult to master the distance to obstacles according to the images. Some current vendors will add reference lines in the images as the reference for judging distance for drivers. Nonetheless, this method only gives approximate distances for drivers. It is not possible to acutely just the distance between an obstacle or a hollow in the road and the car body.

SUMMARY

An objective of the present disclosure is to provide an alarm method for reversing a vehicle, by sensing obstacles using structured light. A structured-light projecting module and a structured-light camera unit are disposed at the rear side of a vehicle. The structured-light camera unit receives a plurality of light pattern messages reflected from obstacles. When the vehicle is reversing, if obstacles exist behind the vehicle, an alarm signal is submitted for reminding the driver of the vehicle.

In order to achieve the above objective and efficacy, the present disclosure discloses an alarm method for reversing a vehicle by sensing obstacles using structured light. The method comprises steps of: using a structured-light projecting module disposed at said vehicle for projecting a plurality of light planes continuously on one or more obstacles surrounding said vehicle; using a structured-light camera unit disposed at said vehicle for receiving a plurality of light pattern messages formed by reflecting the projection of said plurality of light planes from the surface of said one or more obstacles; a processing unit calculating to give a piece of height information of said one or more obstacles according to said plurality of light pattern messages; said processing unit judging if the reversing safety of said vehicle will be influenced according to said height information.

According to an embodiment of the present disclosure, further comprising steps of: said processing unit calculating to give a piece of distance information of said one or more obstacles according to said plurality of light pattern messages; inputting a piece of speed information of said vehicle to said processing unit, and said processing unit calculating to give a piece of alarm distance information according to said speed information; said processing unit retrieving an alarm message from a database according to said alarm distance information and said distance information; an alarm module submitting an alarm notification according to said alarm message.

According to an embodiment of the present disclosure, wherein said processing unit acquires said alarm distance information according to said speed information, a piece of gravitational acceleration information, and a coefficient of friction of the tires of said vehicle.

According to an embodiment of the present disclosure, wherein said step of said processing unit judging if the reversing safety of said vehicle will be influenced according to said height information, said processing unit judges if the reversing safety of said vehicle will be influenced according to said height information of said one or more obstacles and a piece of safety height information of said vehicle.

According to an embodiment of the present disclosure, wherein said step of an alarm module submitting said alarm notification according to said alarm message, one or more audio unit of said alarm module is used for submitting said alarm notification, and said alarm module controls the frequency of said alarm notification submitted by said audio unit according to said alarm message.

According to an embodiment of the present disclosure, further comprising steps of: said processing unit calculating the outline of said one or more obstacles by using said plurality of light pattern messages; analyzing the type of said one or more obstacles according to the outline of said one or more obstacles; ignoring said one or more obstacles if said one or more obstacles will not influence the reversing safety of said vehicle.

According to an embodiment of the present disclosure, further comprising a step of using a camera module to acquire one or more images and a display unit to display said one or more images.

According to an embodiment of the present disclosure, further comprising a step of using a moving-state sensing unit to acquire a moving state of said vehicle for ensuring said moving state being reversing.

According to an embodiment of the present disclosure, further comprising steps of: said processing unit calculating the outline of said one or more obstacles by using said plurality of light pattern messages; a display unit displaying and marking said one or more obstacles according to the outline of said one or more obstacles.

Moreover, the present disclosure further discloses another alarm method for reversing a vehicle by sensing obstacles using structured light. The method comprises steps of: using a structured-light projecting module disposed at said vehicle for projecting a plurality of light planes continuously on one or more obstacles surrounding said vehicle; using a structured-light camera unit disposed at said vehicle for receiving a plurality of light pattern messages formed by reflecting the projection of said plurality of light planes from the surface of said one or more obstacles; a processing unit calculating to give a piece of distance information of said one or more obstacles according to said plurality of light pattern messages; inputting a piece of speed information of said vehicle to said processing unit, and said processing unit calculating to give a piece of alarm distance information according to said speed information; said processing unit retrieving an alarm message from a database according to said alarm distance information and said distance information; an alarm module submitting an alarm notification according to said alarm message.

According to an embodiment of the present disclosure, further comprising steps of: said processing unit calculating to give a piece of height information according to said plurality of light pattern messages; said processing unit judging if the reversing safety of said vehicle will be influenced according to said height information.

According to an embodiment of the present disclosure, wherein said processing unit acquires said alarm distance information according to said speed information, a piece of gravitational acceleration information, and a coefficient of friction of the tires of said vehicle.

According to an embodiment of the present disclosure, wherein said step of said processing unit judging if the reversing safety of said vehicle will be influenced according to said height information, said processing unit judges if the reversing safety of said vehicle will be influenced according to said height information of said one or more obstacles and a piece of safety height information of said vehicle.

According to an embodiment of the present disclosure, wherein said step of an alarm module submitting said alarm notification according to said alarm message, one or more audio unit of said alarm module is used for submitting said alarm notification, and said alarm module controls the frequency of said alarm notification submitted by said audio unit according to said alarm message.

According to an embodiment of the present disclosure, further comprising steps of: said processing unit calculating the outline of said one or more obstacles by using said plurality of light pattern messages; analyzing the type of said one or more obstacles according to the outline of said one or more obstacles; ignoring said one or more obstacles if said one or more obstacles will not influence the reversing safety of said vehicle.

According to an embodiment of the present disclosure, further comprising a step of using a camera module to acquire one or more images and a display unit to display said one or more images.

According to an embodiment of the present disclosure, further comprising a step of using a moving-state sensing unit to acquire a moving state of said vehicle for ensuring said moving state being reversing.

According to an embodiment of the present disclosure, further comprising steps of: said processing unit calculating the outline of said one or more obstacles by using said plurality of light pattern messages; a display unit displaying and marking said one or more obstacles according to the outline of said one or more obstacles.

DETAILED DESCRIPTION

In order to make the structure and characteristics as well as the effectiveness of the present disclosure to be further understood and recognized, the detailed description of the present disclosure is provided as follows along with embodiments and accompanying figures.

According to the prior art, because the image taken by a general image extraction device is a planar image, the driver is hard to estimate the distance from his/her vehicle to an obstacle and the height of the obstacle accurately while reversing. Thereby, the present disclosure provides an alarm method for reversing a vehicle by sensing obstacles using structured light. By using the reflection of the structured light, the real distance between an obstacle and the vehicle, as well as the height of the obstacle, are calculated for the driver's reference. As the obstacle enters the alarm range, the driver will be warned.

Figure 1:
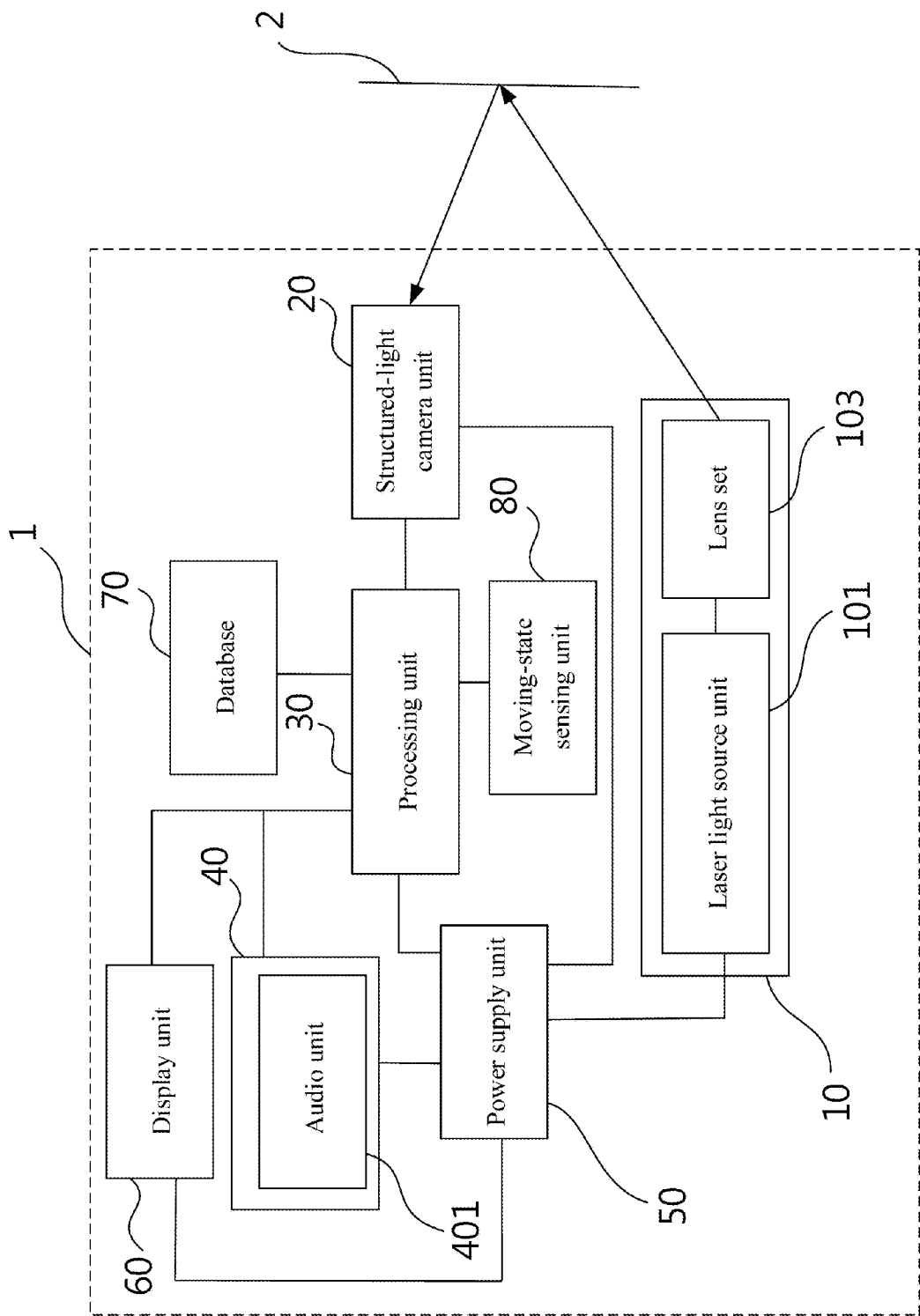
FIG. 1 shows a system block diagram of the alarm method for reversing a vehicle by sensing obstacles using structured light according the first embodiment of the present disclosure.
Figure 2:
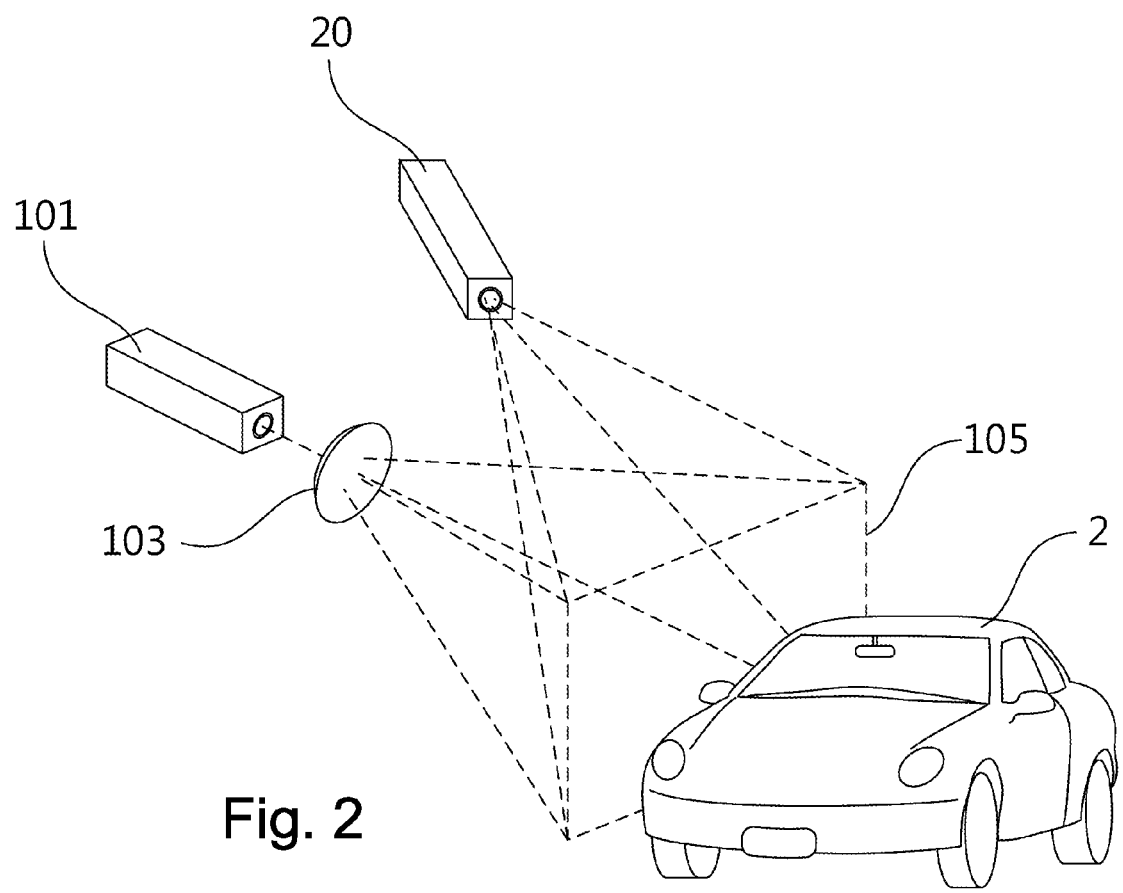
FIG. 2 shows a schematic diagram of applying the alarm method for reversing a vehicle by sensing obstacles using structured light according the first embodiment of the present disclosure, used for illustrating projecting a light plane on an obstacle.

First, please refer to FIG. 1 and FIG. 2. The alarm system for reversing a vehicle by sensing obstacles using structured light disclosed by the present disclosure is disposed on the rear side of a vehicle 1, for example, a car, a bus, or a truck. Here, the alarm system for reversing the vehicle 1 by sensing obstacles using structured light comprises a structured-light projecting module 10, a structured-light camera unit 20, a processing unit 30, an alarm module 40, a display unit 60, a database 70, and a moving-state sensing unit 80. All the units and modules described above can be connected electrically with a power supply unit 50 for gaining the power for operation.

Figure 3:
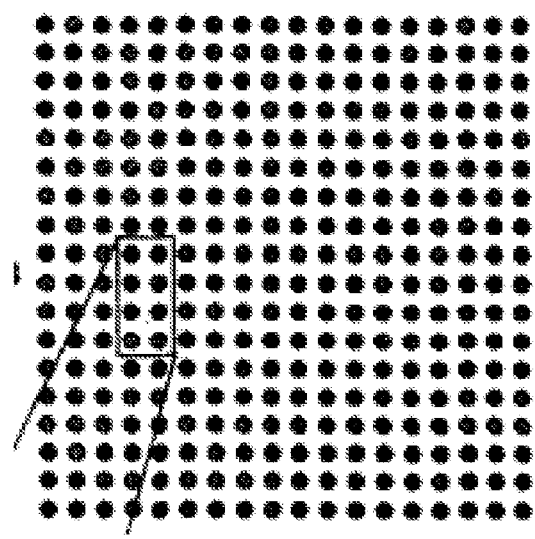
FIG. 3 shows a schematic diagram of a light plane, which includes a two-dimensional point array, of the alarm method for reversing a vehicle by sensing obstacles using structured light according the first embodiment of the present disclosure.

The structured-light projecting module 10 includes a laser light source unit 101 and a lens set 103, and is used for detecting if there exist obstacles, such as moving pedestrians, animals, other vehicles, or fixed fences, bushes, bumps on the road or hollows in the road, in the space within tens of meters behind the vehicle 1 and influencing the safety. The detection method according to the present disclosure is to use the structured light technique. The principle is to use a light source to project controllable light spots, light stripes, or light planes onto a surface of the detected obstacle. Then, use a sensor such as a camera to acquire the reflected image. After some geometric calculations, the stereoscopic coordinates of the obstacle will be given. According to a preferred embodiment of the present disclosure, the invisible laser is adopted as the light source, owing to its superior properties in coherence, attenuation, measurable distance, accuracy, and vulnerability by other light sources. After the light provided by the laser light source unit 101 is dispersed by the lens set 103, it forms a light plane 105 in space. The lens set 103 adopted by the present disclosure can include pattern lenses, which include patterned microstructures for enabling the light plane 105 formed by the transmitted laser light source to have pattern characteristics, such as the two-dimensional light-spot array shown in FIG. 3.

If there exists an obstacle 2, such as a hollow in the ground, or a bump on the ground, behind the vehicle 1, as the light plane 105 is projected on the surface of the obstacle 2, the light will be reflected and then received by the structured-light camera unit 20 in the form of light pattern messages. The structured-light camera unit 20 is a camera unit capable of receiving invisible laser light. The light pattern messages include the deformed patterns formed by irregular reflection of the light plane 105 projected by the structured-light projecting module 10 from the surface of the obstacle 2. After the structured-light camera unit 20 receives the deformed patterns, the processing unit 30 can further use these deformed patterns to reconstruct the stereoscopic outline of the obstacle 2.

The processing unit 30 is an electronic device capable of performing arithmetic and logic operations. The alarm module 40 includes an audio unit 401. After the alarm module 40 receives an alarm message, it can drive the audio unit 401 to submit an alarm, which can be sounds, voices, or other sounds capable of reminding the driver. The display unit 60 can be a liquid crystal display, a plasma display, a cathode-ray tube display, or other display units capable of displaying digital images. The database 70 is an electronic device capable of storing digital information and stores one or more alarm message. It is not required that the database 70 should be disposed at the vehicle 1. It can be disposed externally. By using a wireless or wired method, the database 70 can be connected for accessing the alarm message. The moving-state sensing unit 80 can sense the moving state of the vehicle 1. The moving-state sensing unit 80 judges the moving state of the vehicle 1 according to the information generated by an acceleration sensor or other sensors capable of generating acceleration information. Alternatively, the moving-state sensing unit 80 can judge the moving state of the vehicle 1 according to the gear of the gearshift lever of the vehicle 1. Alternatively, the moving-state sensing unit 80 can be installed in the wheels or the wheel shafts of the vehicle 1 for judging the moving state of the vehicle 1 according to the rotating direction of the wheels or the wheel shafts. The power supply unit 50 can be a battery or an external power supply.

Figure 4:
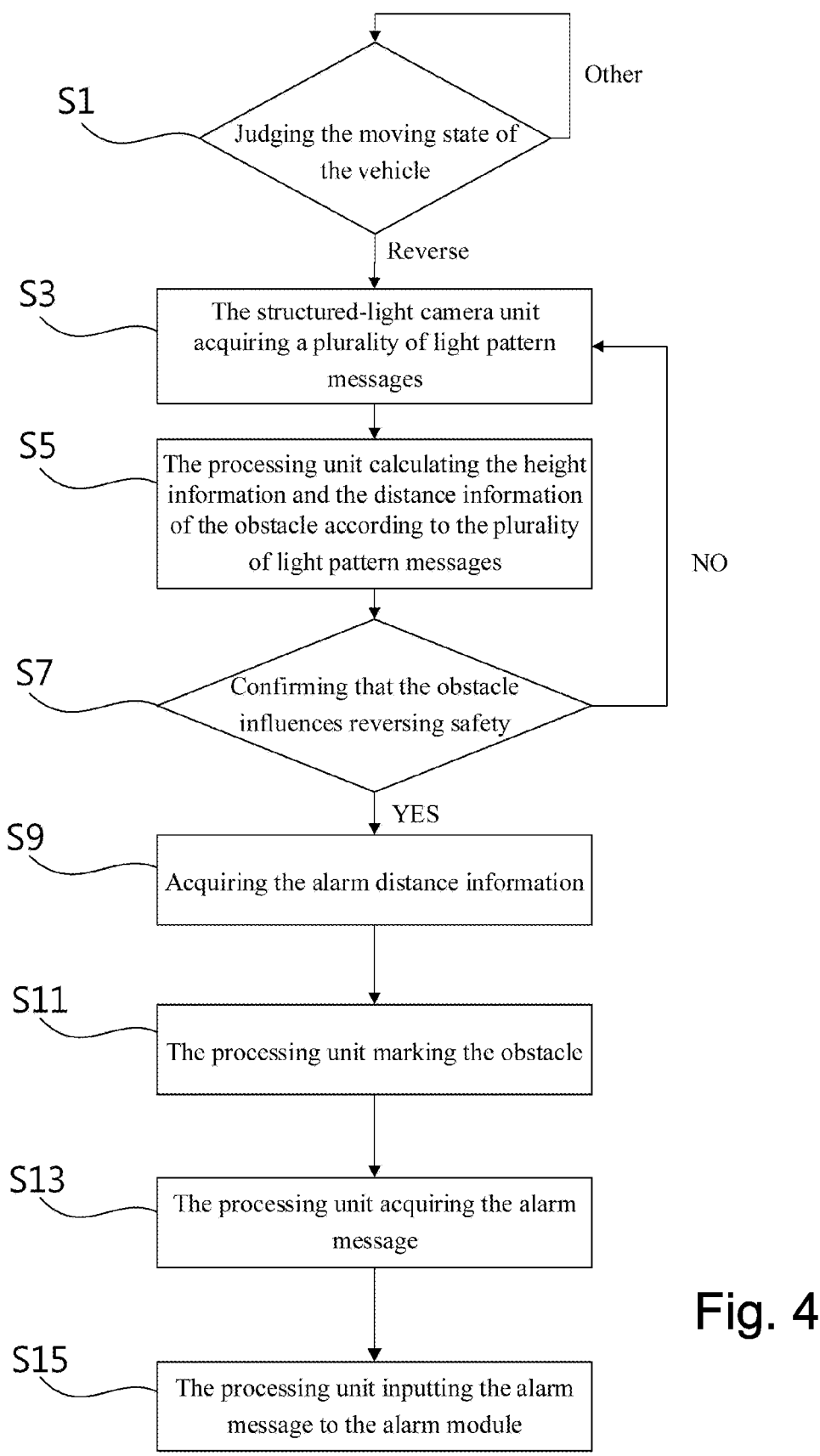
FIG. 4 shows a flowchart of the alarm method for reversing a vehicle by sensing obstacles using structured light according the first embodiment of the present disclosure.

Next, the flow of the alarm method for reversing a vehicle by sensing obstacles using structured light according to the first embodiment of the present disclosure will be described below. Please refer to FIG. 4, which shows a flowchart of the alarm method for reversing a vehicle by sensing obstacles using structured light according to the first embodiment of the present disclosure. As shown in the figure, the alarm method according to the present embodiment comprises steps of:

Step S1: Judging the moving state of the vehicle;
Step S3: The structured-light camera unit acquiring a plurality of light pattern messages;
Step S5: The processing unit calculating the height information and the distance information of the obstacle according to the plurality of light pattern messages;
Step S7: Confirming that the obstacle influences reversing safety;
Step S9: Acquiring the alarm distance information;
Step S11: The processing unit marking the obstacle;
Step S13: The processing unit acquiring the alarm message; and
Step S15: The processing unit inputting the alarm message to the alarm module.

In the following, the flow of the alarm method for reversing a vehicle by sensing obstacles using structured light according to the first embodiment of the present disclosure will be described. Please refer to FIGS. 1 to 4. When the vehicle 1 moves on the road and carries the system that can execute the alarm method for reversing a vehicle by sensing obstacles using structured light according to the present disclosure, the steps S1 through S15 will be executed.

In the step S1 of judging the moving state of the vehicle 1, the moving-state sensing unit 80 judges the current moving state of the vehicle 1. For example, when the moving-state sensing unit 80 is an acceleration sensor, the acceleration sensed by the acceleration sensor can be used for judging whether the vehicle 1 is in the reversing state or other states. When the moving-state sensing unit 80 judges the moving state of the vehicle 1 according to the gear of the gearshift lever of the vehicle 1, whether the vehicle 1 is reversing can be judged according to the gear of the gearshift lever. When the moving-state sensing unit 80 is installed in the wheels or wheel shafts of the vehicle 1, the moving-state sensing unit 80 can judge the moving state of the vehicle 1 according to the rotating direction of the wheels or wheel shafts of the vehicle 1. If the vehicle 1 is not reversing, the step S1 is repeated.

In the step S3, the structured-light camera unit 20 acquires a plurality of light pattern messages. The laser light source unit 101 of the structured-light projecting module 10 emits continuously laser light through the lens set 103, the laser light is dispersed by the lens set 103 and projected continuously a plurality of light planes 105 to the surface of one or more obstacle 2 nearby the vehicle 1. Then the structured-light camera unit 20 acquires a plurality of light pattern messages reflected from the surface of the obstacle 2 as a result of the projection of the plurality of light planes 105. Because the laser light emitted by the laser light source unit 101 will be dispersed by the lens set 103, the projection distance is limited and the laser light will not be projected to the obstacles distant from the vehicle 1. According to an embodiment, the projection distance of the laser light emitted by the laser light source unit 101 is within 15 meters. According to another embodiment, the power of the laser light source unit 101 can be further adjusted for increasing or reducing the projection distance of the laser. For example, if the vehicle is a normal car requiring a shorter braking distance, the power of the laser light source unit 101 can be lowered such that only the obstacles closer to the vehicle 1 will reflect the laser light, and hence reducing electric power consumption as well as reducing the data to be processed by the processing unit 30. If the vehicle is a bus or a traction vehicle requiring a longer braking distance, the power of the laser light source unit 101 can be increased such that farer away from obstacles will reflect the laser light, and hence improving reversing safety.

In the step S5, the processing unit 30 calculates at least one piece of the height information and the distance information of the obstacle 2 according to the plurality of light pattern messages. The processing unit 30 can calculate and analyze the light pattern messages acquired by the structured-light camera unit 20. By using the variations of the light pattern messages, the distance information between the obstacle 2 and the vehicle, the height information of the obstacle 2, and the outline of the obstacle 2 can be given. When the height information of the obstacle 2 is positive, the obstacle 2 is an object or a bump on the ground. When the height information of the obstacle 2 is negative, the obstacle 2 is a hollow in the ground.

In the step S7, the processing unit 30 judges if the obstacle 2 will influence the reversing safety. The processing unit 30 judges if the obstacle 2 will influence the reversing safety of the vehicle 1 according to the height information of the obstacle 2 and the safety height information of the vehicle 1. If so, the step S9 will be executed; otherwise, the step S3 will be executed. The safety height information of the vehicle 1 can be the distance between the chassis of the vehicle 1 and the ground, the radius of the wheel of the vehicle 1, or other predetermined values. Here, the distance between the chassis of the vehicle 1 and the ground is taken as the safety height information for description. When the height of the obstacle 2 is positive and less than the distance between the chassis of the vehicle 1 and the ground, this obstacle 2 will not influence the reversing of the vehicle 1. Likewise, when the height of the obstacle 2 is negative and the absolute value of the height of the obstacle 2 is less than the distance between the chassis of the vehicle 1 and the ground, this obstacle 2 will not influence the reversing of the vehicle 1, either. Contrarily, as the height of the obstacle 2 is positive and greater than the distance between the chassis of the vehicle 1 and the ground, the vehicle 1 will bump into the obstacle 2 while reversing. When the height of the obstacle 2 is negative and the absolute value of height of the obstacle 2 is greater than the distance between the chassis of the vehicle 1 and the ground, the vehicle 1 will fall into the obstacle 2 while reversing and influencing the reversing safety. According to an embodiment, the processing unit 30 can also judge if the obstacle 2 will influence the reversing safety according to the radius of the wheel of the vehicle 1. Furthermore, the driver can set the safety height information according to his customs in driving.

In the step S9, the processing unit 30 acquires the alarm distance information. When the moving-state sensing unit 80 is an accelerometer, the acceleration information generated by the accelerometer can be used to calculate and give the speed information, which is then calculated to give the alarm distance information. Alternatively, the speed information can be given by the sensors installed in the tires, wheel shafts, or other parts of the vehicle 1. After the processing unit 30 acquires the speed, it calculates and gives the alarm distance information, which is the shortest braking distance given by:

$$D_b = \frac{V^2}{2Gu}$$

where V is the current speed of the vehicle 1; G is the gravity; and u is the coefficient of friction of the tires of the vehicle 1.

According to an embodiment of the present disclosure, the processing unit 30 can further acquire the alarm distance information according to the shortest braking distance and the driver's response distance, given as follows:

$$D = D_b + V \times R$$

where R is the driver's response time.

In the step S11, the processing unit 30 marks the obstacle 2. In this step, the display unit 60 displays the light pattern messages reflected by the obstacle 2. The processing unit 30 marks the obstacle 2 on the light pattern messages displayed on the display unit 60 according to the outline of the obstacle 2. Accordingly, the driver can be aware of the existence of the obstacle 2. The processing unit 30 can mark the distance between the obstacle 2 and the vehicle 1 on the display unit 30. For example, when the obstacle 2 is within 3 meters of the vehicle 1, the light pattern messages of the obstacle 2 on the display unit 60 will be marked by "3 meters". The processing unit 30 can further change the color of the light pattern messages on the display unit 60 according to the distance information of the obstacle 2. For example, when the obstacle 2 is within 3 meters of the vehicle 1, the light pattern messages of the obstacle 2 will be displayed on the display unit 60 in red. On the other hand, when the obstacle 2 is within the distance of 3 to 10 meters of the vehicle 1, the light pattern messages of the obstacle 2 will be displayed on the display unit 60 in green.

In the step S13, the processing unit 30 acquires the alarm message. The processing unit 30 acquires the alarm message from the database 70 according to the height information and the distance information of the obstacle 2 and the alarm distance information.

In the step S15, the processing unit 30 inputs the alarm message to the alarm module 40. In this step, the processing unit 30 inputs the alarm message acquired in the step S13 to the alarm module 40. The alarm module 40 controls the audio unit 401 to submit an alarm according to the alarm message.

According to an embodiment of the present disclosure, in the step S13, the processing unit 30 acquires different alarm messages from the database 70 according to different distances information of the obstacle 2. For example, the alarm distance information of the vehicle 1 is 5 meters. When the distance information of the obstacle 2 is 3 meters, the processing unit 30 acquires the first alarm message from the database 70. When the distance information of the obstacle 2 is 10 meters, the processing unit 30 acquires the second alarm message from the database 70.

According to an embodiment of the present disclosure, in the step S15, when the alarm message is the first alarm message, due to the immediate danger, the alarm module 40 will control the audio unit 401 to remind the driver using continuous sounds or notify the impending contact of the obstacle 2 using voices. When the alarm message is the second alarm message, owing to some buffering distance, the alarm module 40 will control the audio unit 401 to remind the driver using intermittent sounds to notify existence of obstacle 2 beyond the alarm distance. When the audio unit 401 reminds the driver using sounds, the frequency of the sound emitted by the audio unit 401 according to the first alarm message will be higher than that according to the second alarm message.

According to an embodiment of the present disclosure, in the step S5, the processing unit 30 can first calculate one of the distance information or the height information and execute completely the corresponding steps of the calculated information before calculating the other. After calculating the other, the corresponding steps of the other are executed. For example, the processing unit 30 can calculate the height information first. Next, the step S7 is executed. Afterwards, the processing unit 30 returns to the step S5 to calculate the distance information. Then the steps S7 through S15 are executed. Alternatively, the processing unit 30 can calculate the distance information first. Next, the step S7 is executed. Afterwards, the processing unit 30 returns to the step S5 to calculate the height information. Then the steps S7 through S15 are executed.

After the above steps are executed, the alarm method for reversing a vehicle by sensing obstacles using structured light according to the first embodiment of the present disclosure is completed. According to the present disclosure, the height information and the distance information of the obstacle 2 behind the vehicle 1 can be given according to the structured light. Then, whether the obstacle 2 will endanger the reversing vehicle 1 can be judged according to the height information, the distance information, and the alarm distance information acquired according to the speed of the vehicle 1 and the coefficient of friction of the tires of the vehicle 1.

Figure 5:
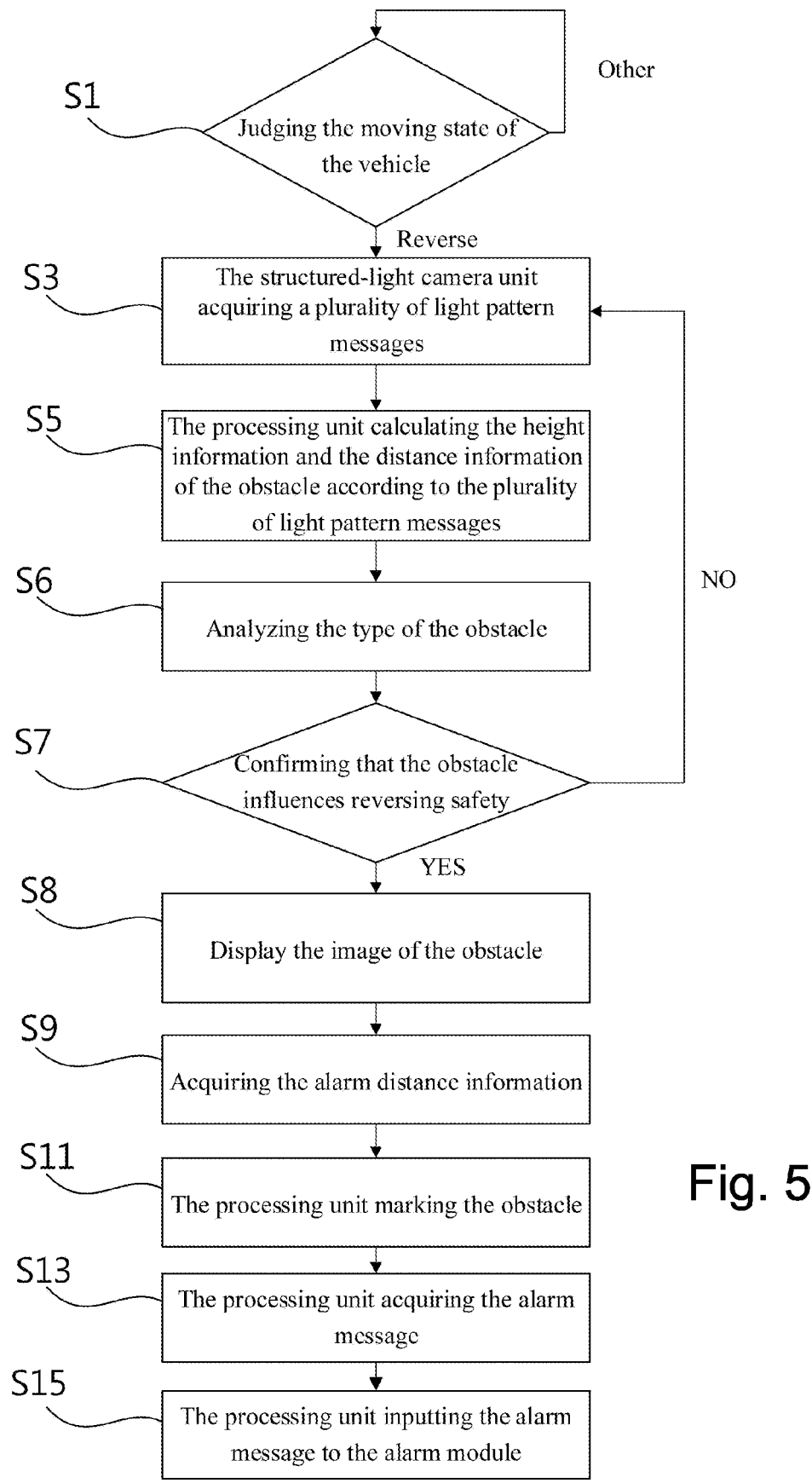
FIG. 5 shows a flowchart of the alarm method for reversing a vehicle by sensing obstacles using structured light according the second embodiment of the present disclosure.
Figure 6:
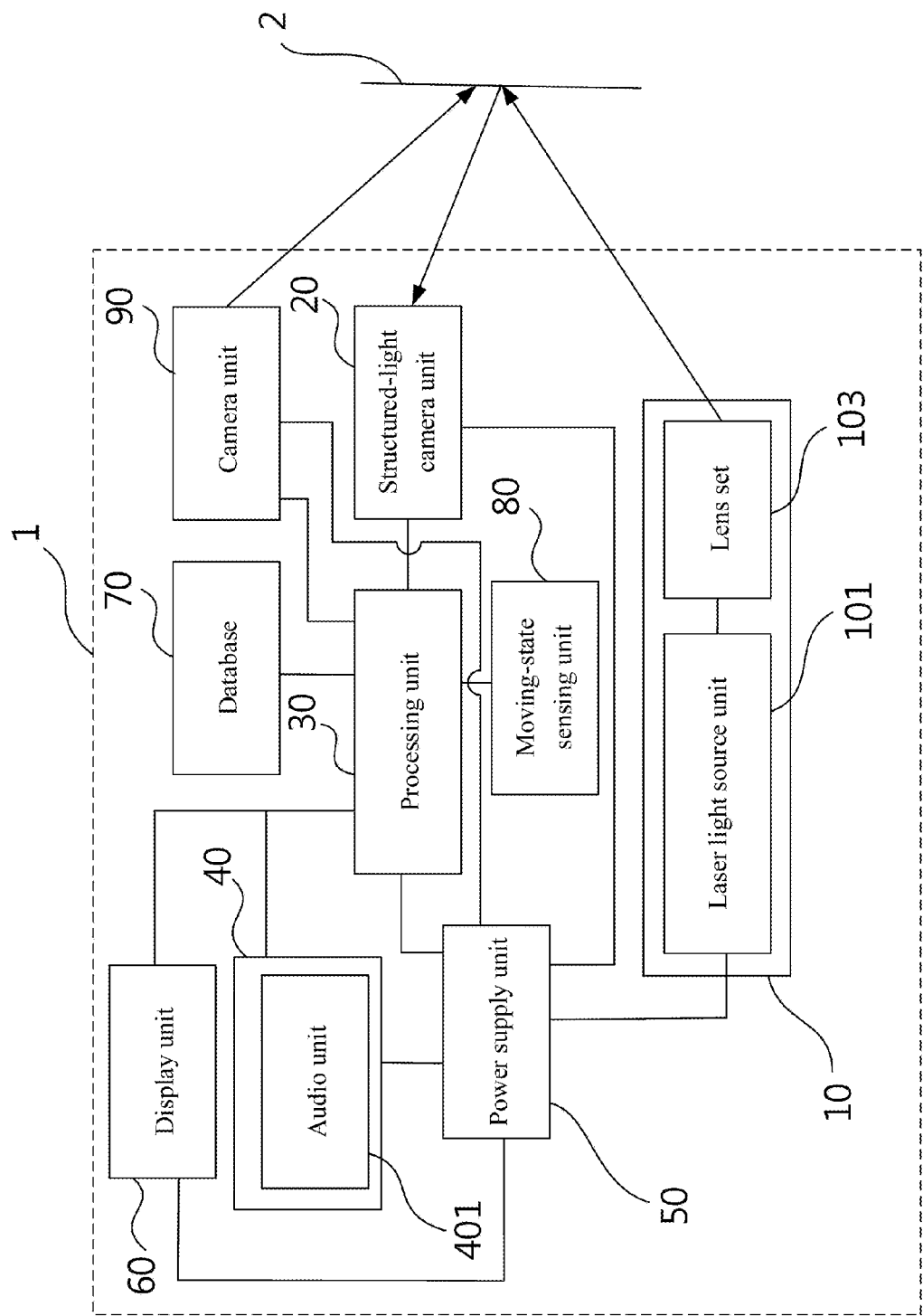
FIG. 6 shows a system block diagram of the alarm method for reversing a vehicle by sensing obstacles using structured light according the second embodiment of the present disclosure.

Next, the alarm method for reversing a vehicle by sensing obstacles using structured light according to the second embodiment of the present disclosure will be described below. Please refer to FIGS. 5 and 6, which show a flowchart and a system block diagram of the alarm method for reversing a vehicle by sensing obstacles using structured light according the second embodiment of the present disclosure. The difference between the present embodiment and the first one is that the system according to the present embodiment further comprises a camera unit 90, which can be a camera or other equipment capable of extracting images continuously. According to the process of the present embodiment, after the step S5, a step S6 is further included for analyzing the type of the obstacle; after the step S7, a step S8 is further included for displaying the image of the obstacle. The rest part of the present embodiment is identical to the first embodiment. Hence, the details will not be described again.

Because different types of obstacles 2 may exist behind the vehicle 1, different obstacle 2 may induce different degrees of influence on reversing safety. For example, rocks, other vehicles, bumps on the road, hollow in the road, or pedestrians will all influence reversing safety. On the other hand, massive weeds essentially will not endanger reversing safety. Accordingly, in the step S6, the processing unit 30 reconstructs the stereoscopic outline of the obstacle 2 using the light pattern messages and classifies the obstacle 2 for judging if it will threaten the vehicle 1. The classification method includes identification using the exterior features of different obstacles 2 by comparing the features of the obstacle 2 with the data pre-stored in the database 70. After classification, an obstacle 1 not endangering the reversing safety, such as weeds not threatening reversing safety, can be judged. Then the processing unit 30 can ignore the obstacle 2.

According to an embodiment of the present disclosure, in the step S6, the processing unit 30 can first adopt a grouping algorithm to group the obstacles 2 in the light pattern messages before identifying the obstacles 2. The light pattern messages include the reflected structured light from the ground and one or more obstacle 2. The ground and the obstacle 2 can be first separated by the grouping algorithm. When the light pattern messages include multiple obstacles 2, the ground and the obstacles 2 can be classified by the grouping algorithm into the first obstacle, the second obstacle, and so on. Consequently, in the subsequent classification of the obstacles 2, the outline of the obstacles 2 can be given effectively.

According to an embodiment of the present disclosure, the grouping algorithm is the K-means clustering algorithm.

In the step S8, the camera unit 90 will shoot the surroundings continuously to get an image. The processing unit 30 displays the obstacle 2 in the image on the display unit 60 according to the outline and the location of the obstacle 2 acquired in the step S5.

According to the second embodiment of the present disclosure, the driver can further judge the type and distance of the obstacle 2 more accurately according to the image of the obstacle 2 display on the display unit 60.

According to an embodiment of the present disclosure, the structured-light projecting module 10, the structured-light camera unit 20, and the camera unit 90 are disposed on the rear side of the vehicle 1.

According to an embodiment of the present disclosure, the angle between the structured-light projecting module 10 and/or the structured-light camera unit 20 and/or the camera unit 90 and the ground is less than or equal to 90 degrees. In practical applications, while reversing the vehicle 1, all the driver needs to know is whether the obstacle 2 influencing reversing safety exists behind. In other words, only a partial outline of the obstacle 2 should be provided; the whole picture of the obstacle 2 is not required. By adjusting the angle between the structured-light projecting module 10 and/or the structured-light camera unit 20 and/or the camera unit 90 and the ground, the acquired light pattern messages or image of the obstacle 2 will not be the whole picture of the obstacle 2. Thereby, the computation of the processing unit 30 and the information received by the driver can be reduced.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

What is claimed is:

1. An alarm method for reversing a vehicle by sensing obstacles using structured light, applied to a vehicle, comprising steps of:
   using a structured-light projecting module disposed at said vehicle for projecting a plurality of light planes continuously on one or more obstacles surrounding said vehicle;
   using a structured-light camera unit disposed at said vehicle for receiving a plurality of light pattern messages formed by reflecting the projection of said plurality of light planes from the surface of said one or more obstacles;
   a processing unit calculating the outline of said one or more obstacles by using said plurality of light pattern messages;
   a display unit displaying and marking said one or more obstacles according to the outline of said one or more obstacles;

said processing unit calculating to give a piece of height information of said one or more obstacles according to said plurality of light pattern messages;
said processing unit calculating to give a piece of distance information of said one or more obstacles according to said plurality of light pattern messages;
inputting a piece of speed information of said vehicle to said processing unit, and said processing unit calculating to give a piece of alarm distance information according to said speed information; and
said processing unit judging if the reversing safety of said vehicle will be influenced according to said height information;
wherein said processing unit acquires said alarm distance information according to said speed information, a piece of gravitational acceleration information, and a coefficient of friction of the tires of said vehicle.

2. The alarm method for reversing a vehicle by sensing obstacles using structured light of claim 1, and before said step of said processing unit judging if the reversing safety of said vehicle will be influenced according to said height information, further comprising steps of:
said processing unit retrieving an alarm message from a database according to said alarm distance information and said distance information; and
an alarm module submitting an alarm notification according to said alarm message.

3. The alarm method for reversing a vehicle by sensing obstacles using structured light of claim 1, wherein said step of said processing unit judging if the reversing safety of said vehicle will be influenced according to said height information, said processing unit judges if the reversing safety of said vehicle will be influenced according to said height information of said one or more obstacles and a piece of safety height information of said vehicle.

4. The alarm method for reversing a vehicle by sensing obstacles using structured light of claim 2, wherein said step of an alarm module submitting said alarm notification according to said alarm message, one or more audio unit of said alarm module is used for submitting said alarm notification, and said alarm module controls the frequency of said alarm notification submitted by said audio unit according to said alarm message.

5. The alarm method for reversing a vehicle by sensing obstacles using structured light of claim 1, and after said step of using a structured-light camera unit disposed at said vehicle for receiving a plurality of light pattern messages formed by reflecting the projection of said plurality of light planes from the surface of said one or more obstacles, further comprising steps of:
analyzing the type of said one or more obstacles according to the outline of said one or more obstacles; and
ignoring said one or more obstacles if said one or more obstacles will not influence the reversing safety of said vehicle.

6. The alarm method for reversing a vehicle by sensing obstacles using structured light of claim 1, and after said step of said processing unit calculating to give a piece of height information of said one or more obstacles according to said plurality of light pattern messages, further comprising a step of using a camera module to acquire one or more images and a display unit to display said one or more images.

7. The alarm method for reversing a vehicle by sensing obstacles using structured light of claim 1, and before said step of using a structured-light projecting module disposed at said vehicle for projecting said plurality of light planes continuously on one or more obstacles surrounding said vehicle, further comprising a step of using a moving-state sensing unit to acquire a moving state of said vehicle for ensuring said moving state being reversing.

8. An alarm system for reversing a vehicle by sensing obstacles using structured light, applied to a vehicle, comprising:
a structured-light projecting module disposed at said vehicle for projecting a plurality of light planes continuously on one or more obstacles surrounding said vehicle;
a structured-light camera unit disposed at said vehicle for receiving a plurality of light pattern messages formed by reflecting the projection of said plurality of light planes from the surface of said one or more obstacles;
a processing unit calculating the outline of said one or more obstacles by using said plurality of light pattern messages;
a display unit displaying and marking said one or more obstacles according to the outline of said one or more obstacles;
said processing unit calculating to give a piece of distance information of said one or more obstacles according to said plurality of light pattern messages;
inputting a piece of speed information of said vehicle to said processing unit, and said processing unit calculating to give a piece of alarm distance information according to said speed information;
said processing unit retrieving an alarm message from a database according to said alarm distance information and said distance information; and
an alarm module submitting an alarm notification according to said alarm message;
wherein said processing unit acquires said alarm distance information according to said speed information, a piece of gravitational acceleration information, and a coefficient of friction of the tires of said vehicle.

9. The alarm system for reversing a vehicle by sensing obstacles using structured light of claim 8, and after inputting a piece of speed information of said vehicle to a processing unit, further comprising:
said processing unit calculating to give a piece of height information according to said plurality of light pattern messages; and
said processing unit judging if the reversing safety of said vehicle will be influenced according to said height information.

10. The alarm system for reversing a vehicle by sensing obstacles using structured light of claim 9, wherein during said processing unit judging if the reversing safety of said vehicle will be influenced according to said height information, said processing unit judges if the reversing safety of said vehicle will be influenced according to said height information of said one or more obstacles and a piece of safety height information of said vehicle.

11. The alarm system for reversing a vehicle by sensing obstacles using structured light of claim 8, wherein upon an alarm module submitting said alarm notification according to said alarm message, one or more audio unit of said alarm module is used for submitting said alarm notification, and said alarm module controls the frequency of said alarm notification submitted by said audio unit according to said alarm message.

12. The alarm system for reversing a vehicle by sensing obstacles using structured light of claim 8, and after said structured-light camera unit disposed at said vehicle for receiving a plurality of light pattern messages formed by reflecting the projection of said plurality of light planes from the surface of said one or more obstacles, further comprising:

analyzing the type of said one or more obstacles according to the outline of said one or more obstacles; and
    ignoring said one or more obstacles if said one or more obstacles will not influence the reversing safety of said vehicle.

13. The alarm system for reversing a vehicle by sensing obstacles using structured light of claim 8, and after said processing unit calculating to give a piece of distance information of said one or more obstacles according to said plurality of light pattern messages, further comprising a camera module to acquire one or more images and a display unit to display said one or more images.

14. The alarm system for reversing a vehicle by sensing obstacles using structured light of claim 8, and before said structured-light projecting module disposed at said vehicle for projecting said plurality of light planes continuously on one or more obstacles surrounding said vehicle, further comprising a moving-state sensing unit to acquire a moving state of said vehicle for ensuring said moving state being reversing.

\* \* \* \* \*